W. J. Stevens,
Steam Slide Valve.
No. 1,957. Reissued May 16, 1865.
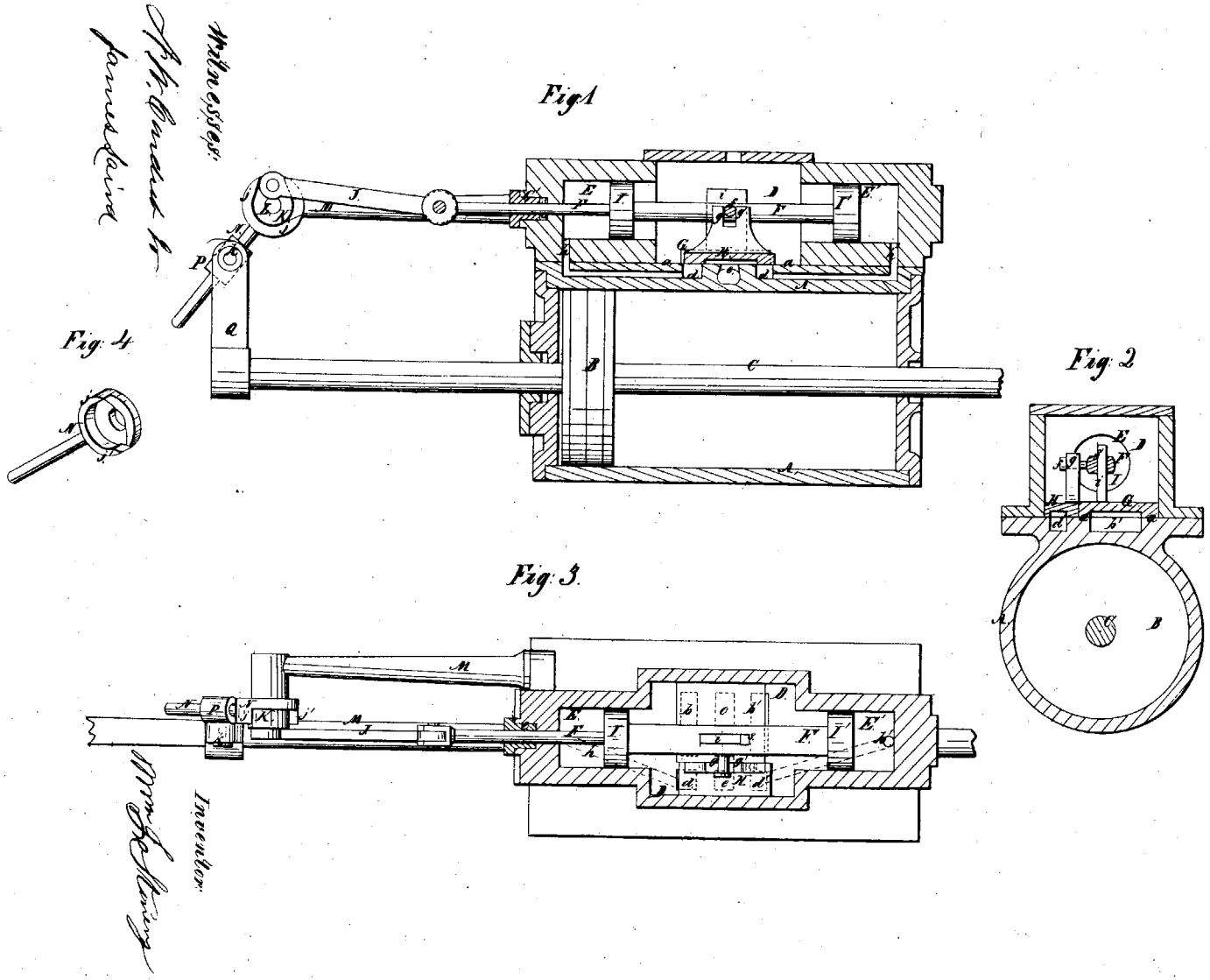
N. PETERS, PHOTO-LITHOGRAPHER, WASHINGTON, D. C.

UNITED STATES PATENT OFFICE.

NATHAN W. CONDICT, JR., AND DUDLEY S. STEELE, OF JERSEY CITY, NEW JERSEY, ASSIGNEES, BY MESNE ASSIGNMENTS, OF WILLIAM J. STEVENS.

IMPROVEMENT IN THE MEANS OF OPERATING THE VALVES OF STEAM-ENGINES.

Specification forming part of Letters Patent No. 31,917, dated July 23, 1861; Reissue No. 1,957, dated May 16, 1865.

*To all whom it may concern:*

Be it known that we, NATHAN W. CONDICT, Jr., and DUDLEY S. STEELE, of Jersey City, in the county of Hudson and State of New Jersey, are the owners, by assignments duly recorded in the Patent Office, of Letters Patent for an invention of WILLIAM J. STEVENS, of the city, county, and State of New York, of certain new and Improved Means of Operating the Induction and Eduction Valves of Steam-Engines, dated July 23, 1861, and numbered 31,917; and we do hereby declare that the following is a full, clear, and exact description of the same, reference being had to the accompanying drawings, forming part of this specification, in which—

Figure 1 is a central vertical longitudinal section of an engine illustrating a mode of applying the invention. Fig. 2 is a transverse section of the cylinder and valve-chest. Fig. 3 is a plan of the same with the valve-chest in section; and Fig. 4, a perspective view of a forked lever, constituting a part of the mechanism for opening the valve.

Similar letters of reference indicate corresponding parts in the several figures.

This invention is more particularly designed for direct-action steam-engines, for pumping, blowing, and other purposes for which a reciprocating motion is required and no rotary motion is necessary. It relates to the use of a secondary slide-valve and system of ports for effecting the induction and eduction of steam to act upon pistons, or their equivalents, attached to or connected with the main slide-valve for the purpose of producing or completing the movement of the latter.

It consists, first, in so combining the main and secondary valves, when working on seats arranged as mentioned, with each other and with the mechanism through which the movements of the said valves are in part produced by the main piston-rod of the engine, that there is a lost motion between the main and secondary valves to permit the secondary valve to have the necessary lead with respect to the main valve in the movements of the two valves in either direction.

It also consists in certain novel mechanism, through which the main piston-rod is made to produce the necessary movement of the secondary valve to admit steam to act upon the pistons, or their equivalents, attached to or connected with the main valve.

To enable others skilled in the art to make and use the invention, we will proceed to describe its construction and operation.

A is the engine-cylinder; B, the piston, and C the piston-rod.

D is the valve-chest, having attached to it at opposite ends two short cylinders, E E′, standing in line with each other and parallel with the main cylinder A. These cylinders E E′ are open to the valve-chest at their inner ends but closed at their outer ends, except that E has a stuffing-box, C′, for the passage of the valve-rod F.

G is the main valve, which is of the kind known as the "short three-port valve," and *a a* is its seat, having the usual arrangement of steam-ports *b b′* and exhaust-port *c*.

At the side of the valve seat *a*, and either parallel or in the same plane with it, is the seat of the secondary valve H, which is like the main valve G, only narrower, and works over a system of ports, *d d′ e*, which are arranged and spaced like *b b′ c*, as shown in Fig. 3, but narrower, as they are required for the passage of a very much smaller quantity of steam. The ports *d d′* communicate by passages *h h′* with the outer ends of the cylinders E E′, and the port *e* communicates with the main exhaust-port *c*, or is in any other way brought into constant communication with the exhaust-pipe. The cylinders E E′ are fitted with pistons I I′, one each, the inner ends of which are always exposed to the pressure of steam in the valve-chest, the said pistons being rigidly secured to the valve-rod F. The secondary valve H is connected with the rod F by a pin, *f*, secured to the rod, and entering between two lugs, *g g′*, on the back of the valve, or by any other means by which the said valve can be operated without any lost motion relatively to the rod. The main valve is connected with the rod F by means of a slot, *s*, in the rod, and a tenon, *i*, on the back of the valve, the slot being longer than the tenon, to allow a considerable degree of lost motion of the rod with respect to the valve. The connection may be made by any other means that will allow of the lost motion between the main and secondary valves, the object of which is, that while both valves are operated by the same rod F the secondary valve H may always have the lead of the main valve. The valve-rod F is connected outside of the cylinder E by a connecting-rod, J, with a short crank, K, which is loose on a fixed stud, L, secured in a rigid arm, M, attached to the main cylinder, or in any other fixed support. This crank serves to limit the movement of the valves and also to effect the first part of the movement thereof in either direction, as will be presently described. The stud L has also fitted loosely to it a lever, N, of which Fig. 4 is a separate view, on which there is formed a fork, *j j*, embracing the crank K, but made so much wider as to permit the crank to make a quarter of a revolution within the said fork. The lever N is fitted into a sleeve, P, which is pivoted by a pin, *k*, to an arm, Q, that is rigidly secured to the main piston-rod C.

The operation of the valve is as follows: The first part of the movement of both of them is effected by the action of the arm Q of the main piston-rod on the lever N, the prongs *j j'*, of the fork of the said lever operating alternately on opposite sides of the crank K to bring the said crank from a horizontal position on either side of the stud L to the vertical position shown in Fig. 1, and the movement of the valves is completed by the action of the valve-rod, produced by the admission of steam by the secondary valve H to act upon the piston I or I', the crank K being by that means brought from the vertical position to the horizontal position opposite to that from which it started.

To illustrate the operation clearly we will first suppose the main piston B to be completing its stroke to the left, as represented in Fig. 1. In doing this, the arm Q has moved the lever N to such a position that the prong *j* of its fork has brought the crank K from a horizontal position on the left side of the fixed stud L to a vertical position above the said stud, as shown in the figure, and the crank has moved the valve-rod, pistons I I', and valves to the right far enough for the secondary valve H to have commenced opening its port *d* to the steam in the chest D and its port *d'* to the exhaust-port *e*, but not far enough for the main valve G to have opened the port *b* to the steam and the port *b* to the exhaust. This condition is represented in Fig. 2. The steam entering by the port *d* and passage *h* to the cylinder E while the port *d'* and passage *h'* are open to the exhaust acts very quickly on the piston I, and causes the valve-rod, the valves, and the other piston, I', to move quickly to the right far enough to give the port *b* a wide opening to the steam and *b'* a wide opening to the exhaust pipe. This movement is limited by the crank K arriving in a horizontal position on the right side of the fixed stud L. The main piston then commences moving to the right, and as it completes the said movement causes the projection *j'* on the lever N to bring the crank again to the upright position represented in Fig. 1, and so moves the valves H and G to such a position that the opening of the port *d'* to the steam and *d* to the exhaust has commenced, when steam enters by the passage *h'* into the cylinder E' and acts upon the piston I', thereby causing the further movement of both valves in a sudden manner to the left as far as permitted by the crank K, thus completing the opening of the port *d'* to the steam and *d* to the exhaust, and effecting the opening of the main port *b'* to the steam and *b* to the exhaust, and so causing the movement of the main piston to the left to take place. In completing its movement to the left the arm Q acts upon the lever N, and causes the prong *j* of the said lever to bring the crank to the upright position represented in Fig. 1. The continued operation is but a repetition of that described.

Instead of the lever N and crank K being both loose on a fixed stud, as described, either may be secured to a rock-shaft upon which the other is fixed loosely.

Having thus described the invention, we will proceed to state what we claim and desire to secure by Letters Patent—

1. When a main and secondary slide-valve are employed on seats arranged side by side in the same steam-chest and in the same plane or parallel planes, as and for the purpose specified, so combining the said valves with each other and with mechanism through which they are both in part actuated by the main piston-rod of the engine that there is a lost motion between the said valves, substantially as and for the purpose herein set forth.

2. The direct connection of the said main and secondary valves with the same operating-rod F, having attached to it the pistons I I' for completing the movement of the main valve and having a lost motion with respect to the main valve but none with respect to the secondary valve, substantially as herein specified.

3. The crank K and forked lever N, applied substantially as herein described, in combination with each other and with the valve-rod and main piston-rod, substantially as and for the purpose herein set forth.

N. W. CONDICT, JR.
D. S. STEELE.

Witnesses:
HENRY T. BROWN,
GEO. W. REED.